United States Patent
Wall et al.

(10) Patent No.: US 11,328,065 B1
(45) Date of Patent: May 10, 2022

(54) ARCHITECTURES, SYSTEMS, AND METHODS FOR BUILDING TRUSTED AND SECURE ARTIFACTS

(71) Applicant: Stripe, Inc., San Francisco, CA (US)

(72) Inventors: Jonathan Wall, San Francisco, CA (US); Andy Reitz, San Francisco, CA (US); Ed Flanagan, San Francisco, CA (US)

(73) Assignee: STRIPE INC., San Francisco, CA (US)

( * ) Notice: Subject to any disclaimer, the term of this patent is extended or adjusted under 35 U.S.C. 154(b) by 0 days.

(21) Appl. No.: 16/523,797

(22) Filed: Jul. 26, 2019

(51) Int. Cl.
| | |
|---|---|
| *G06F 9/44* | (2018.01) |
| *G06F 21/57* | (2013.01) |
| *G06F 8/36* | (2018.01) |
| *G06F 8/70* | (2018.01) |
| *H04L 9/32* | (2006.01) |
| *G06F 8/60* | (2018.01) |

(52) U.S. Cl.
CPC ............... *G06F 21/57* (2013.01); *G06F 8/36* (2013.01); *G06F 8/60* (2013.01); *G06F 8/70* (2013.01); *H04L 9/3236* (2013.01); *H04L 9/3247* (2013.01); *G06F 2221/033* (2013.01)

(58) Field of Classification Search
CPC ..... G06F 8/36; G06F 8/60; G06F 8/70; G06F 21/57; G06F 2221/033; H04L 9/3236; H04L 9/3247
USPC .................................. 717/101–113, 124–126
See application file for complete search history.

(56) References Cited

U.S. PATENT DOCUMENTS

| | | | | |
|---|---|---|---|---|
| 9,569,204 | B2* | 2/2017 | Mansour | G06F 8/447 |
| 9,880,837 | B2* | 1/2018 | Khazanchi | G06F 9/45558 |
| 10,120,670 | B1* | 11/2018 | Atkinson | G06F 9/455 |
| 10,528,332 | B2* | 1/2020 | Atkinson | G06F 9/455 |
| 10,635,577 | B2* | 4/2020 | Baughman | G06F 8/71 |

(Continued)

OTHER PUBLICATIONS

Vivek Juneja, "The Bakery Model for Building Container Images and Microservices", 2016, retrieved from https://thenewstack.io/bakery-foundation-container-images-microservices/, 9 pages. (Year: 2016).*

(Continued)

*Primary Examiner* — Ted T. Vo
(74) *Attorney, Agent, or Firm* — Womble Bond Dickinson (US) LLP

(57) ABSTRACT

Architectures, systems and methods for building trusted and secure artifacts are disclosed. In one embodiment, the method comprises: receiving inputs including one or more instances of software code; verifying trustworthiness of the one or more inputs; creating software code using a forward immutable continuous integration (CI) pipeline having a plurality of stages with forward immutability between consecutive pipeline stages to receive the one or more inputs verified as trustworthy and to build and test one or more containers associated with the one or more inputs, wherein each subsequent stage after a first stage of the pipeline depends on an immutable output of an immediately preceding stage in the pipeline, and further wherein the pipeline includes an emission stage for outputting signed, trusted software code from the pipeline; and storing signed, trusted software code in a repository for deployment, the repository only accepting signed software code for deployment.

23 Claims, 5 Drawing Sheets

(56) References Cited

U.S. PATENT DOCUMENTS

2019/0235847 A1* 8/2019 Nguyen .................... G06F 8/35
2020/0125344 A1* 4/2020 Varghese ................. G06F 8/10

OTHER PUBLICATIONS

AWS, "AWS CodePipeline User Guide", 2018, Amazon Web Service, Inc., 355 pages. (Year: 2018).*

Netflix Technology Blog , "How We Build Code at Netflix", 2016, retrieved from https://netflixtechblog.com/how-we-build-code-at-netflix-c5d9bd727f15 , 8 pages. (Year: 2016).*

* cited by examiner

ARCHITECTURES, SYSTEMS, AND METHODS FOR BUILDING TRUSTED AND SECURE ARTIFACTS

FIELD OF THE INVENTION

Embodiments of the present invention relate to the field of build systems to creating and deploying software and/or other artifacts; more particularly, embodiments of the present invention relate to creating and deploying software and/or other artifacts in a provably secure and trustworthy manner.

BACKGROUND

Software development usually involves a number steps including determining requirements, drafting specifications, designing a software architecture, coding, testing, debugging, and deploying or otherwise releasing the software. In software product development, a software build environment may be used to create, test and debug a software project using tools as an interface to the software development process. One result of a software development process is the generation of executable and binary files derived from one or more source files containing source code. Thereafter, these executable and binary files may be released or deployed for use.

Typically, build environments are susceptible to security deficiencies. For example, if the input into the build environment is not trustworthy, then software that is output by the build, or that subsequently operates in conjunction with software output from the build, may be vulnerable. Furthermore, some build environments are not secure in themselves. Thus, even if the input to the build environment is trustworthy, the build environment itself may be compromised, which, in turn, makes the output of the build environment potentially untrustworthy. With the inputs being potentially untrustworthy as well as the build environment itself, using built environments to create software that software developers are willing to release or deploy for execution, particular for use with previously released and trusted software, is not a comfortable situation for the software developers.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

DETAILED DESCRIPTION

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

A framework for building trusted and secure software code and/or artifacts is disclosed. This is particularly critical for a security-oriented engineering organization that regularly deploys software code. In one embodiment, each artifact includes software code, such as, for example, software code compiled and tested for deployment (e.g., released code or executable code). However, artifacts are not limited to software code and may include configurations or architectures, functions, or other tangible outputs produced during the development of software. In one embodiment, the built software code and/or artifacts is stored in a repository for on-demand retrieval or deployment.

In one embodiment, the framework uses a continuous integration (CI) build environment to produce the trusted and secure artifacts. In one embodiment, the framework is implemented using a build system having a trusted input, a secure build pipeline and a signed output. The secure build pipeline includes build and test pipeline stages. In one embodiment, the secure build pipeline has a property of forward immutability between pipeline stages and is both trusted and hermetic.

Figure 1:
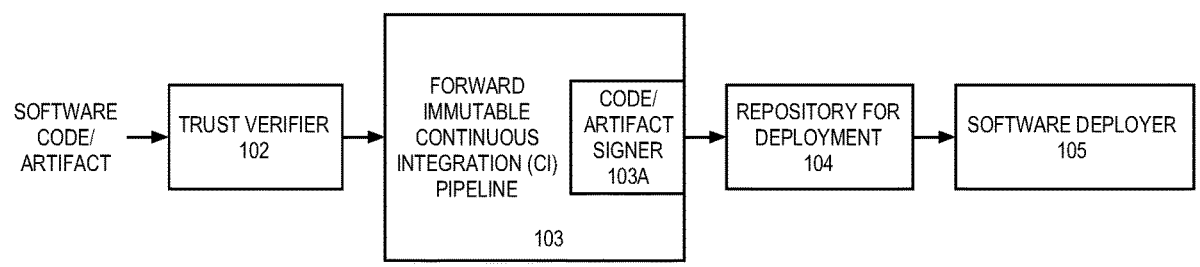
FIG. 1 is a data flow diagram of a forward immutable continuous integration build framework.

FIG. 1 is a data flow diagram of a forward immutable continuous integration (CI) build framework. In one embodiment, the CI framework allows developers to integrate code into a shared repository. This may be performed a number of times over a predetermined period of time (e.g., multiple times a day). Each code that is checked into the repository is verified by a build, allowing the detection of problems early in development. In one embodiment, the framework is implemented with one or more computer systems, servers, hardware, software, and or firmware.

Referring to FIG. 1, a trust verifier 102 receives inputs 101 and verifies their trustworthiness. In one embodiment, inputs 101 include one or more instances of software code. Each instance of software code may include one or more, for example, but not limited to, machine images (e.g., an Amazon Machine Image (AMI), etc.), a software source (e.g., an open source software source) produced by Jenkins or some other server-based system, files from a repository (e.g., a Github Enterprise repository). In another embodiment, inputs 101 include one or more artifacts. The artifacts may include software code or instances of code as set forth above. In one embodiment, one or more of inputs 101 are obtained from a repository.

In one embodiment, trust verifier 102 verifies the trustworthiness of inputs 101. In one embodiment, trust verifier 102 performs a file verification and authentication process to verify the integrity of inputs 101. In one embodiment, the file verification is performed using hash-based verification that compares a hash value (e.g., a cryptographic hash value) that it generates for an input (e.g., a file) with a hash value stored with the input (e.g., the file). If the values match, then trust verifier 102 concludes that the input hasn't been modified during storage by an untrusted third party. In alternative embodiments, trust verifier 102 uses other tools for verification and authentication such as, for example, digital signatures.

After trust verification, the inputs are provided or otherwise made available to a forward immutable continuous integration (CI) pipeline 103 in order to create software code for deployment. In other words, in one embodiment, trust verifier 102 stores trusted code into a repository for access by the pipeline 103. In one embodiment, a procedure for pipeline 103 is triggered automatically when the software code is committed to the repository by trust verifier 102. Alternatively, pipeline 103 is triggered in response to a notification that trusted code is available for pipeline 103. Pipeline 103 could be triggered to operate in response to a manual input.

In one embodiment, pipeline 103 is implemented as a build pipeline that has a plurality of stages with forward immutability between consecutive pipeline stages to receive the one or more inputs verified as trustworthy and to build and test software. The software may be part of one or more containers associated with the one or more inputs. In one embodiment, in the build pipeline, each subsequent stage after a first stage of the build pipeline depends on an immutable output of an immediately preceding stage in the build pipeline.

In one embodiment, the build pipeline receives notification of the availability of software code, and then compiles the software code and runs integration tests on the software code. After integration testing is done, the build pipeline creates images (e.g., machine images, AWI, etc.) that contains the software code for deployment. For example, the AWI may contain fully baked and built software code to deploy a complete running instance, including the installation and configuration of all required software (e.g., an application, application runtime environment, and an operating system).

In one embodiment, the pipeline includes an emission stage 103A for outputting signed, trusted software code from the pipeline. In one embodiment, emission stage 103A only outputs code or an artifact that has been signed. In one embodiment, the signing is done using a key. For example, in one embodiment, the signing is performed using a GPG key of the person updating and/or modifying the software. In another embodiment, the signing is performed using keys of the person modifying the software and any individual reviewing and/or approving the modification. Note that a policy associated with the software code being developed may dictate the signing required for output from the pipeline. For example, an update to software that is considered to have more importance or criticality to an organization may require a higher level or greater number of approvers/reviewers that dictate the signing (or amount thereof) necessary for output from emission stage 103A of the pipeline.

After signing and output from emission stage 103A, the signed, trusted software code is stored in a repository 104 for deployment using software deployer 105. In one embodiment, repository 104 only accepts signed software code. In one embodiment, repository 104 has a registry service, such as, for example, a Docker Hub, and the signed software code images are pushed there so that they may be deployed using software deployer 105.

In one embodiment, software deployer 105 deploys the software in a manner well-known in the art. In one embodiment, software deployer 105 includes a deploy pipeline of deploying code to one or more servers through various stages.

Thus, the forward immutable continuous integration (CI) build framework of FIG. 1 serves as a path for software deployment. Additional details associated with implementations of the above referenced operations, including each of each stages of the forward immutable CI pipeline are described in more detail below.

Trusted Input Dependencies—Verified Input Artifacts

As discussed above, only verified inputs are allowed into the CI build pipeline. When these inputs come from a verified source, such as, for example, a previous build of the organization, the chain of trust is easy to verify by the rust verifier using internal information. However, there are instances where builds are performed using software from outside an organization. For example, the software that is going to be input into the build is open source software. In this case, in one embodiment, in order to ensure the validity of external dependencies, files include a specific version and checksum (e.g., a hash value) for the desired artifact (e.g., a public jar). When such an artifact is downloaded from a public location (e.g., the public web) and cached, the trust verifier validates its checksum against the expected checksum in the file (e.g., BUILD=file). In this fashion, only valid replicas of public artifacts (e.g., jars) are allowed into the CI build pipeline.

In one embodiment, all third-party artifacts are required to have a SHA-1 hash. In this case, the trust verifier verifies the SHA-1 hash against the downloaded jar. Also, in one embodiment, the trust verifier verifies third-party Git artifacts against a SHA-256 hash.

Once the software and/or associated artifacts are verified, the trust verifier provides them to the forward immutable CI pipeline as trusted inputs.

Forward Immutable CI Pipeline

Figure 2:
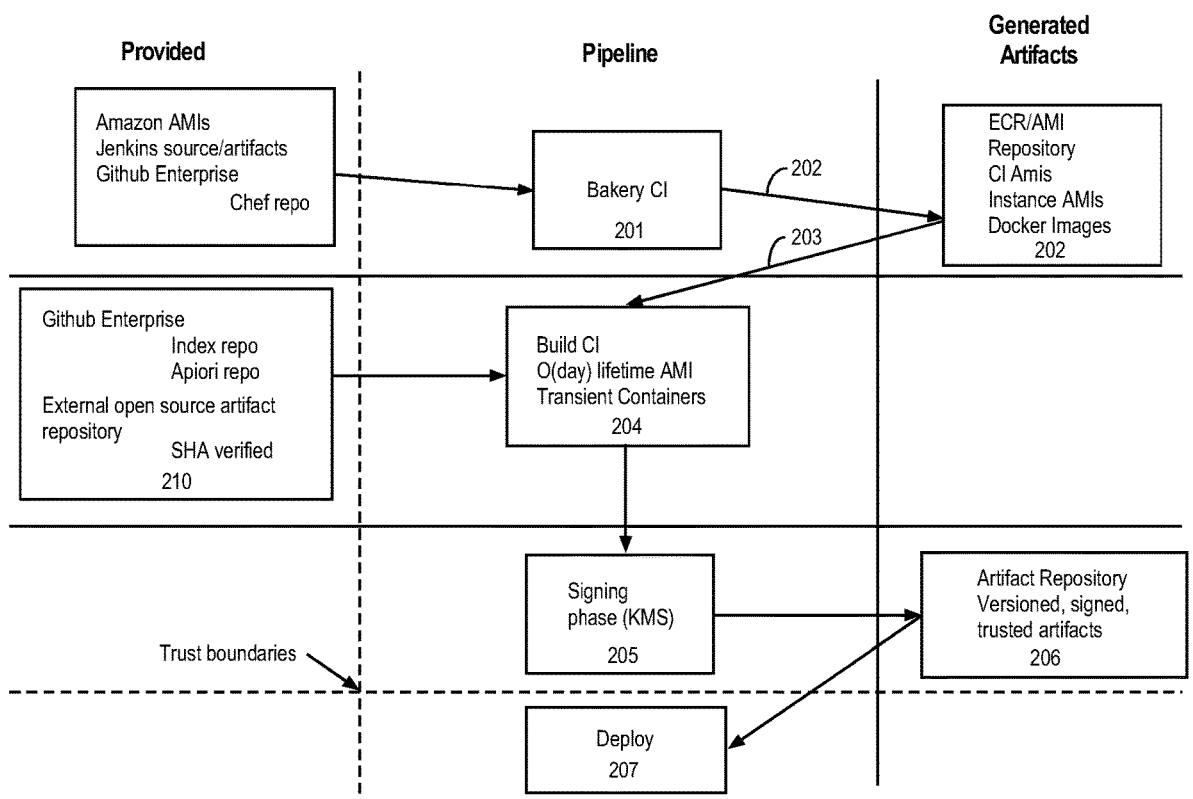
FIG. 2 illustrates one embodiment of a forward immutable continuous integration (CI) pipeline.

FIG. 2 illustrates one embodiment of a forward immutable CI pipeline. In one embodiment, the forward immutable CI pipeline is implemented as a build pipeline consisting of a set of stages. In one embodiment, the first stage of the build pipeline acts as the root of trust for the system. In one embodiment, to ensure security, the root of the pipeline is only accessible to a select group of individual, and includes tight audit features. Each subsequent stage of the build pipeline inherits the security of and depends on the immutable output of the previous stage.

A critical notion of the pipeline is forward immutability such that for each stage of the pipeline, all assets generated in a prior stage are immutable to actors in that stage of the pipeline. To give a specific example, the AMIs/containers generated in phase 201 would be immutable to the run time in phase 203.

Due to the notion of forward immutability, in one embodiment, each stage of the pipeline is only capable of leveraging assets from previous phases of the pipeline, gathering new validated input and building/generating a new output for the following pipeline stage for which the assets would be immutable. Even so, the characteristic of forward immutability allows a chain of trust to be built such that each stage is able to derive its notion of security from the previous stage.

Referring to FIG. 2, the five stage build pipeline that flows through a bakery CI phase 201, a repository phase 202, a build deploy phase 203, a build CI phase 204, and an emission stage 205.

In one embodiment, bakery CI phase 201 use continuous integration (CI) to build and test the container images before shipping (or deploying) them to their registry for deployment. In one embodiment, bakery CI phase 201 builds the containers in response to trusted inputs that are provided. In one embodiment, the trusted inputs include one or more of Amazon AMIs, Jenkins source/artifacts, and instances of software. In one embodiment, bakery CI phase 201 performs a process of acquiring, building and releasing machine images or other containers to allow repeatable deployments of working code. Thus, bakery CI phase 201 builds containers that include software. In one embodiment, containers are generated by bakery CI phase 201 that include machine images such as, for example, CI Amazon Machine Images (AMIs) and instance AMIs (e.g., AMIs from which cluster servers are launched), and build images (e.g., Docker images used to execute specific builds). Note that in one embodiment, Jenkins master/worker CI nodes are launched from the CI AMIs.

In one embodiment, the output of a bakery is a baked image that is used to spin off instances of machine images, such as, for example, but not limited to, virtual machines (VMs) or containers, in any compatible environment. The environment may be in the form of hypervisors or container engines that support the deployment of these baked images.

In one embodiment, the artifacts (e.g., containers) generated by the bakery CI phase 201 are stored in and accessed from a repository (e.g., a GitHub Enterprise Chef repository) as part of phase 202. In one embodiment, the repository is a Docker Image/AMI Repository that holds the registry (e.g., an Elastic Container Registry (ECR)) used to store Docker images and AMIs. In one embodiment, the AMIs are stored in an S3 bucket. Alternatively, another cloud storage resource for object storage may be used. In one embodiment, both are tagged with the Git SHA (or other hash) used to build them and a build ID.

After artifacts are generated by bakery CI phase 201 and stored in a repository as part of phase 202, a bakery deploy phase 203 is used to deploy the software to the build CI phase 204. In one embodiment, bakery deploy phase 203 deploys specified CI AMIs to the build CI phase 204. In one embodiment, the CI AMIs are used to launch Jenkins clusters to orchestrate distributed builds. In such a case, a CI server downloads and builds code from different links, checks for any errors that occur when running them against inbuilt tests, and then reports those errors in a log in an automated fashion.

In response to the CI AMIs deployed in bakery deploy phase 203 and CI hooks from repository 201 (e.g., a GitHub Enterprise repository, an external open source artifact repository, etc.), build CI phase 204 builds images containing code (e.g., application code) used to execute specific build targets. These build images are output as artifacts.

After build CI phase 204, an emit phase 205 signs the artifacts and puts them into an artifact repository 206 which stores signed artifacts so that they may be deployed during a deploy phase 207. In one embodiment, the Shiner KMS signing utility is used for signing the output of the build CI phase 204. In one embodiment, repository 206 is an append-only repository, such as, for example, but not limited to an append-only S3 bucket in which the bucket has versioning enabled or that a particular S3 key has only one version which once written cannot be modified.

Once artifacts are stored in repository 206, they may be deployed using software deploy stage 207. In this way, software developed and tested as part of a build process is deployed into use.

Because inputs into the forward immutable CI pipeline are trusted inputs (e.g., software code, artifacts, etc.), there is a trust boundary between the inputs and the forward immutable CI pipeline. Furthermore, since the output of the forward immutable CI pipeline is a signed, trusted artifact, the output of the forward immutable CI pipeline also forms a trust boundary. These two trust boundaries and the forward immutability of the CI pipeline itself allow the framework to be provably or demonstrably secure.

Note that in one embodiment, the pipeline described above allows for builds to commence at any stage of the pipeline without needing to re-build previous steps and automatically building all subsequent steps using the latest changes. Thus, the framework also assures that the final deploy operation is representative of the latest, tested changes.

In one embodiment, observability tools (e.g., exception anomaly detection) are integrated within the proper build step to perform actions such as, for example, but not limited to, rollbacks, etc. This helps create a robust CI/continuous deployment (CD) feedback loop.

The isolation of a build function to a specific stage of the pipeline allows for the constraint of capability in later stages of the pipeline. To give an example, in one embodiment, as policy, the bakery builds CI Master/CI Agent AMIs and builds images that do not include unbounded tools as the bakery would be responsible for creating a hermetic and complete self-contained set of build artifacts.

In one embodiment, to ensure that stages with imperfect "in-stage" immutability are immutable, additional controls are used. For example, during an individual stage, there may be sub-stages that produce a result for a later sub-stage of a single pipeline stage. To ensure the trustworthiness of that result (and avoid an intermediary modifying that result prior to the sub-stage to which the result is used), improved security could be used. In one embodiment, a read-only file system(s) is used to store such results of each sub-stage in one stage producing a result that is used by a later sub-stage in that one stage to ensure they are trustworthy when subsequently used within the pipe stage.

Bakery CI

The bakery CI stage is the first stage and root of trust in the build pipeline. In one embodiment, the bakery phase is responsible for building a Jenkins master AMI, a Jenkins worker AMI, and any Docker images necessary to run specific builds.

In one embodiment, the bakery CI stage runs on a CI cluster. In one embodiment, the cluster is a set of processing components (e.g., servers, virtual machines (VMs), etc.) that operate together to perform a set of data processing operations. Alternatively, the cluster comprises a group of nodes where each node representing a single machine (e.g., a physical machine in a datacenter, a virtual machine hosted on a cloud provider) or unit of computing hardware. Since the Bakery CI itself runs on a CI cluster, the initial build and bootstrap of the cluster is manual. Beyond the initial build, the bakery CI stage leverages prior instances to build the next version.

In one embodiment, the Bakery CI stage's trusted input is from a GHE repository that's mostly a Chef configuration (or other configuration language) that provisions AMIs. In one embodiment, the Bakery CI phase is divided into smaller parts such that a Jenkins Bakery CI phase only builds Jenkins AMIs and a subsequent phase builds only Instance AMIs and Docker Images. In one embodiment, future steps of the CI pipeline require Docker to properly isolate containers from one another, and therefore the Chef configuration ensures that Docker is installed and configured properly on these machines.

In one embodiment, the Chef configuration contained in this repository ensures the immutability of the resulting CI and Instance AMIs. For example, in one embodiment, Chef removes any/all unbounded binaries from the output CI and instance AMIs. Similarly, in one embodiment, build-specific Docker images are tuned to only include compilation tools necessary for the specific build they were designed to execute. In one embodiment, the input repositories are separated into a CI only repository and an Instance AMI+ build container repository.

In one embodiment, while the later stages of the build pipeline enjoy forward immutability from one stage of the pipeline to another, the Bakery CI stage has a similar benefit in the form of temporal immutability. Specifically, the Bakery CI output repository for AMIs/containers is append-only such that the Bakery CI or root phase enjoyed forward immutability from past runs of the Bakery CI pipeline. In one embodiment, append-only behavior is implemented by using Amazon Web Services (AWS) permissions and/or application logic. Additional secure methods (e.g., artifact signing) may be used.

AMI/Container Repository

In one embodiment, the AMI/container repository is append-only from the Bakery CI and read-only from the downstream Build CI. As noted, the append-only nature of this repository gives the Bakery CI a notion of forward immutability that is temporal i.e. previous builds are immutable to Bakery CI phase.

In one embodiment, the final output artifact repository is append-only from the Build CI stage such that only new trusted and signed artifacts are produced. This repository would be read-only from the deploy environment such that the trusted artifacts could not be modified.

Bakery Deploy

In one embodiment, the Bakery CI stage of the pipeline produces trusted CI AMIs that can be used to orchestrate the Build CI stage of the pipeline. In one embodiment, the Bakery deploy stage uses a "deploy" repository to describe the desired configuration of the AMIs in the Build CI and deploys them to ensure the Build CI is legally configured. This deploy operation gives a build team an additional gate to audit and validate changes and allow for the Bakery to be rolled forward/back as necessary.

Build CI

In one embodiment, the Build CI is triggered by the repository (e.g., any mapped GHE repository), with the triggered build depending upon the previous Bakery CI phase and an immutable Docker image to run the specific build instance. The required images are fetched from the repository (and optionally cached to save bandwidth) and since no additional provisioning is required, a container is launched and the build can start immediately. In one embodiment, a Dockerfile is committed to the source repository that explicitly selects the Docker image build version (produced from the bakery stage) to use.

In one embodiment, the CI build process is as follows. First, an engineer commits a change to the bakery repository. Then that engineer kicks off a build that produces a new Docker image and then creates a series of pull requests (PRs), in each repository, to cause the Dockerfile to use the new Docker image. The PRs get merged in, and the new Docker image is officially in use. Note that this flow blocks the automatic forward trigger of subsequent builds.

In another embodiment, the "consumers" of the Docker image use the "latest" version (i.e., the images are still versioned), but new builds are forward triggered using the "latest" version.

Output Artifact Signing

In one embodiment, the output of the Build CI phase is a completed/built artifact passed into the artifact emission phase, or stage. In one embodiment, a build CI container has permission to publish the resulting artifacts and digest. In one embodiment, the signing is performed by a KMS-backed signer. In one embodiment, the signing is performed using GPG keys. The build CI worker is given a signed attestation of the source SHA (and repo metadata) and the CI worker presents Shiner with the attestation and resulting digest and receives a complete attestation (S(source,artifact, metadata)). This is stored alongside the artifact in an S3 bucket.

Enabling Caching

In one embodiment, one or more cache memories are used to store outputs of the build pipeline. These build outputs may be used at another stage or sub-stage in the pipeline. In one embodiment, each of the outputs that are stored include a list of output file names and the hashes of their contents.

In one embodiment, the caching is used to share code between different builds. In one embodiment, the client is configured to use remotely cached artifacts, and/or to mite locally built artifacts to the cache. In one embodiment, access to the cache is through HTTP authentication.

In one embodiment, the caching is an open source remote build cache, such as, for example, but not limited to, a Bazel Remote Cache, which is well-known in the art, that allows previously build portions of the code to be obtained so that the entire set of code does not have to be rebuilt when a code update occurs. Other caching may be used such as gem caching. For example, Ruby gems may be used to cause intermediate results and outputs to be stored in a remote server, where Ruby gems are well-known in the art.

Note that the use of such caches is not necessary. For example, in one embodiment, cacheless master builds are used. In this case, the master branch builds do not depend on a cache. Because there is not cache, these builds emit target level cacheable artifacts and the artifacts are tagged with a master hash, such as, for example, a SHA hash.

Trusted Code and the Repository for Deployment

In one embodiment, to ensure the authenticity of code and/or artifacts generated by the CI pipeline that are committed to the repository and to protect the integrity of the commit chain, all such code and artifact commits are signed with a key. In one embodiment, the key used for signing is an identification key, such as a GPG key, that identifies the signor. In alternative embodiments, other keys may be used to sign the code and/or artifacts being committed to the repository that identifier. For example, in an alternative embodiment, the key used for signing is a key of a public/private key encryption pair.

In one embodiment, only instances of software code that have been signed (e.g., signed commits) are allowed to be merged into master code. That is, code that has been updated and/or modified is only deployed if the code has been signed.

In one embodiment, all code committed to the deployment repository is approved by one or more reviewers with push access. In one embodiment, the repository does not accept code unless it's signed by both the code developer and one or more reviewers.

In one embodiment, the repository is configured to only accept GPG signed commits, where the acceptance merges the code of the GPG signed commits with the master code. In this case, the public GPG keys and other signatures are stored in GitHub Enterprise (GHE) and used to accept the commits. In alternative embodiments, an automatic code checker, such as, for example, but not limited to, CIBot, or an interface, such as, but not limited to, the Github API, is used to merge commits on behalf of developers.

In summary, embodiments of the framework described above concentrate trust in a very narrowly scoped Bakery CI stage and rely on downstream forward immutability and trust derived from that root of trust.

Embodiments described above include a number of benefits. These benefits include a performance side effect that the bakery phase reduces any runtime customization in both containers and CI AMIs. This aspect of baking the build components combined w/versioning provides the benefit of a hermetic build system.

Figure 3:
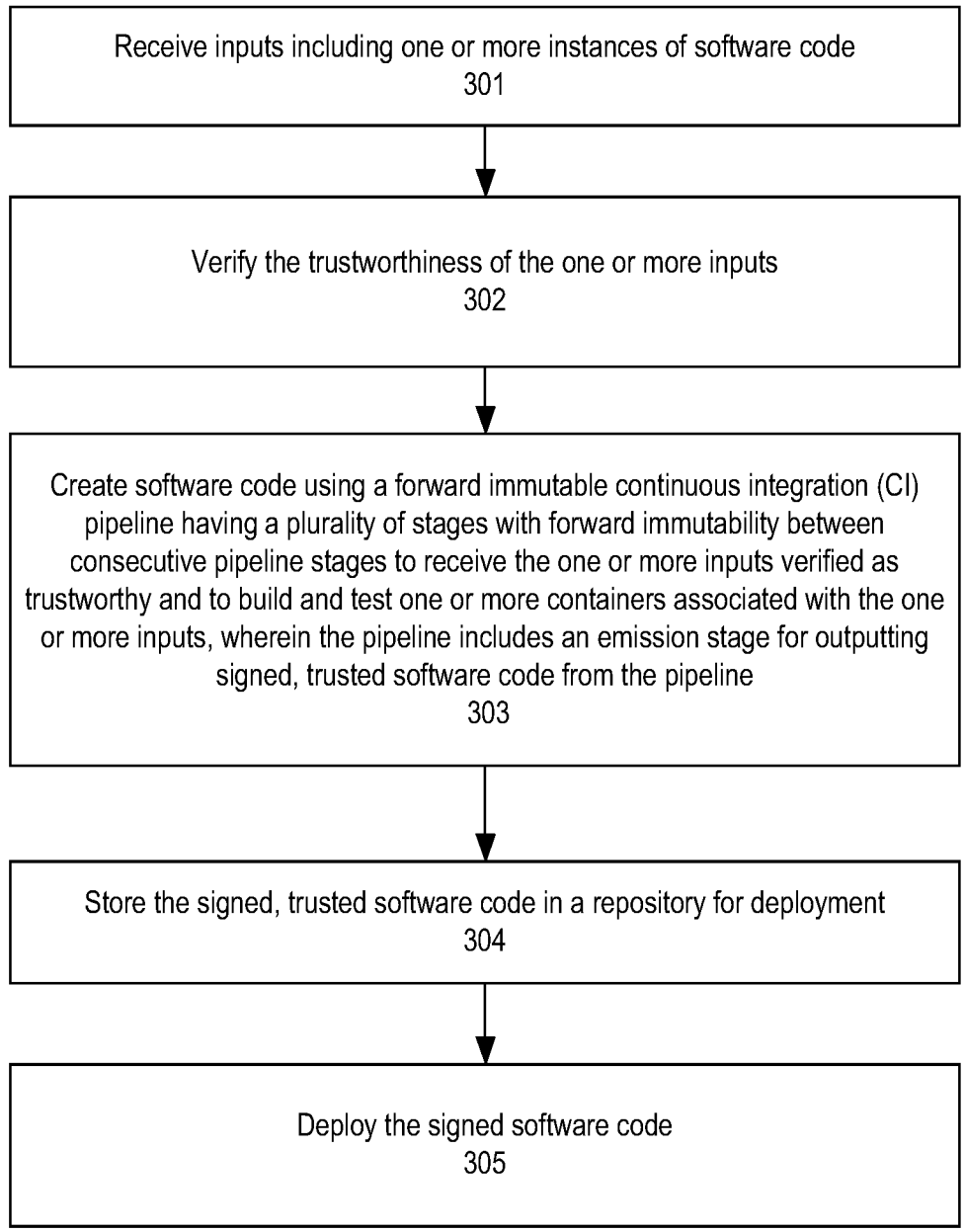
FIG. 3 is a flow diagram of one embodiment of a process for assembling software components in a provably secure manner.

FIG. 3 is a flow diagram of one embodiment of a process for assembling software components in a provably secure manner. The process is performed by processing logic that may comprise hardware (circuitry, dedicated logic, etc.), software (such as is run on a general-purpose computer system, a server, or a dedicated machine), firmware, or a combination of the three.

Referring to FIG. 3, the process begins by processing logic receiving inputs including one or more instances of software code (processing block 301). In one embodiment, the inputs comprise at least one image or container (e.g., machine image, AWI, etc.), artifact, etc.

After receipt, processing logic verifies the trustworthiness of the one or more inputs (processing block 302). In one embodiment, verifying trustworthiness of the one or more inputs comprises comparing a datum (e.g., a hash value, checksum, etc.) derived from digital data of each of the one or more inputs against an expected value.

Once the inputs are verified as trustworthy, processing logic creates software code using a forward immutable continuous integration (CI) pipeline having a plurality of stages with forward immutability between consecutive pipeline stages to receive the one or more inputs verified as trustworthy and to build and test software code associated with the one or more inputs, signs the created software, and outputs signed, trusted software code from the pipeline (processing block 303). In one embodiment, the software code is part of one or more containers or machine images (e.g., an AMI, etc.). In one embodiment, each subsequent stage in the pipeline after a first stage of the pipeline depends on an immutable output of an immediately preceding stage in the pipeline. In at least one embodiment, at least one of the plurality of stages performed a series of pipeline operations are performed and at least one intermediate result produced within the series of pipeline operations are written to a read-only file system.

In one embodiment, signing the software code is performed using a GPG key assigned to an individual. Alternatively, the signing of the software code is performed using other keys, such as, for example using keys from public/private key pairs, encryption keys, etc.

Processing logic stores the signed, trusted software code in a repository for deployment (processing block 304). In one embodiment, the repository only accepts signed software code for deployment.

Subsequent to the signing of the software code and its storage into a deploy repository, processing logic deploys the signed software code (processing block 305). In one embodiment, the deployment of software occurs in a manner well-known in the art.

Figure 4:
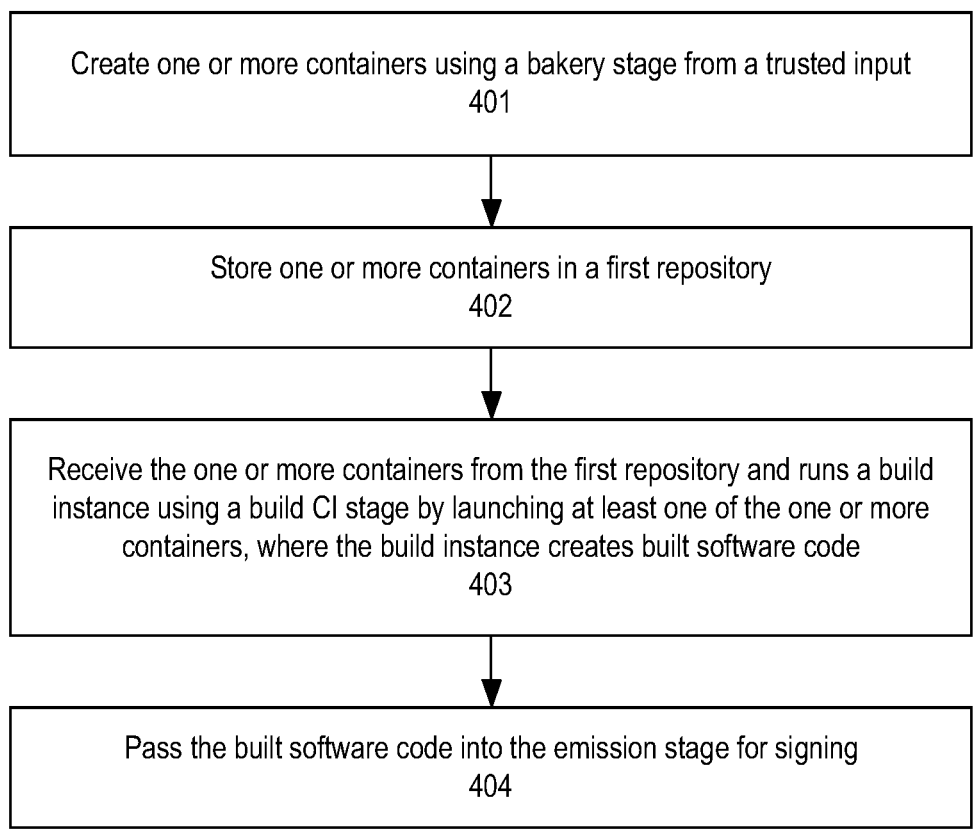
FIG. 4 is a flow diagram of one embodiment of a process for creating software using a forward immutable CI pipeline.

FIG. 4 is a flow diagram of one embodiment of a process for creating software using a forward immutable CI pipeline. The process is performed by processing logic that may comprise hardware (circuitry, dedicated logic, etc.), software (such as is run on a general-purpose computer system, server, or a dedicated machine), firmware, or a combination of the three.

Referring to FIG. 4, the process begins by processing logic creating one or more containers with software code using a bakery stage from a trusted input (processing block 401). Processing logic stores one or more containers in a first repository (processing block 402).

Processing logic receives the one or more containers from the first repository and runs a build instance using a build CI stage by launching at least one of the one or more containers, where the build instance creates built software code (processing block 403).

Thereafter, processing logic passes the built software code into the emission stage for signing (processing block 404). The signing of the built software code occurs as described above. The signed software code is stored in a repository, which may be the first repository discussed above. In one embodiment, the first repository is an append-only repository from the bakery stage and read-only from the build CI stage.

Figure 5:
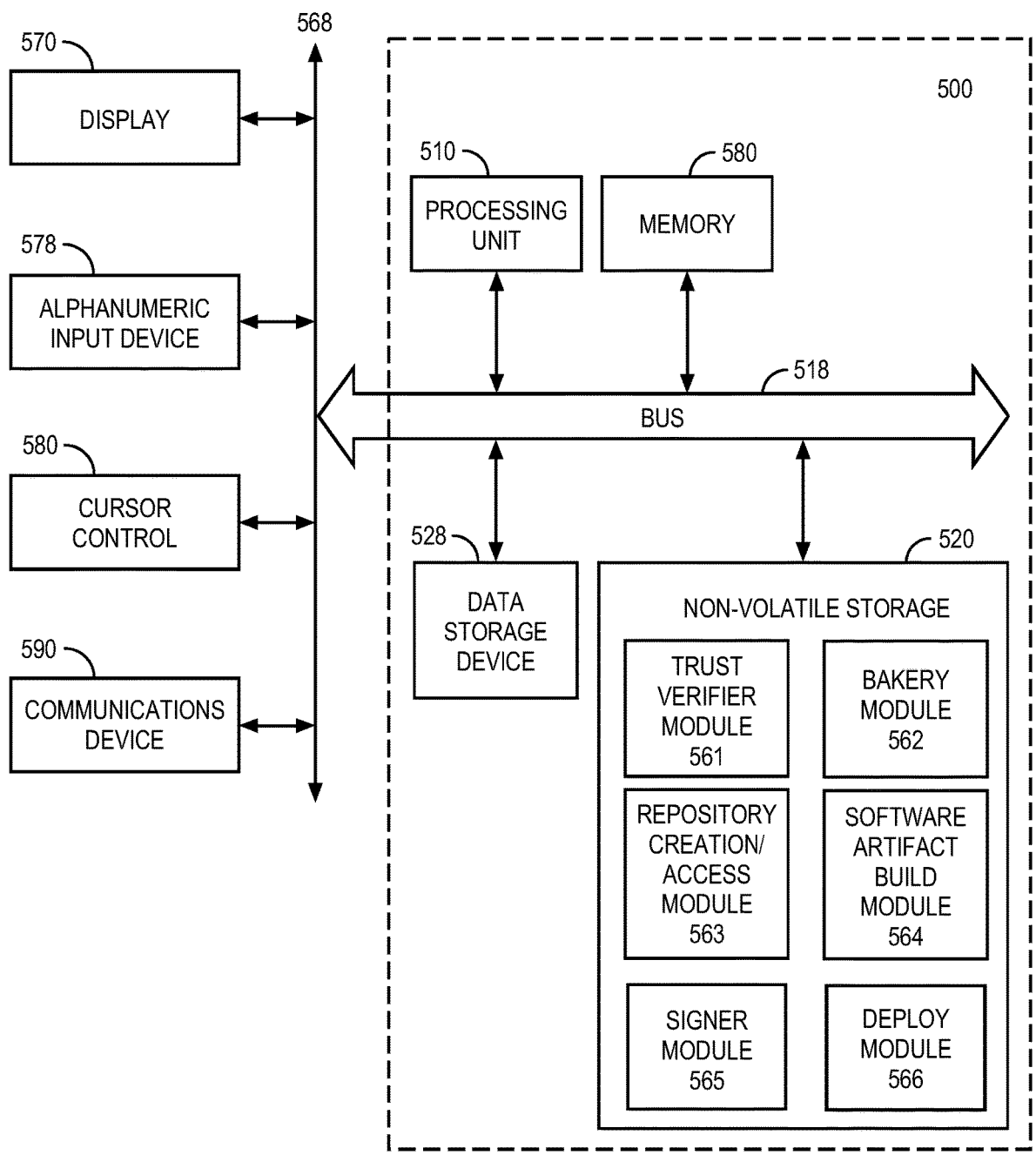
FIG. 5 is one embodiment of a computer system.

FIG. 5 is one embodiment of a computer system that may be used to support the systems and operations discussed herein. It will be apparent to those of ordinary skill in the art, however that other alternative systems of various system architectures may also be used.

The data processing system illustrated in FIG. 5 includes a bus or other internal communication means 515 for communicating information, and a processor 510 coupled to the bus 515 for processing information. The system further comprises a random access memory (RAM) or other volatile storage device 550 (referred to as memory), coupled to bus 515 for storing information and instructions to be executed by processor 510. Main memory 550 also may be used for storing temporary variables or other intermediate information during execution of instructions by processor 510. The system also comprises a read only memory (ROM) and/or static storage device 520 coupled to bus 515 for storing static information and instructions for processor 510, and a data storage device 525 such as a magnetic disk or optical disk and its corresponding disk drive. Data storage device 525 is coupled to bus 515 for storing information and instructions.

In one embodiment, static storage device 520 stores a trust verifier module 561 which when executed causes the system to perform trust verification as described above, stores a bakery module 562 which when executed causes the system to execute a bakery (e.g., CI bakery) as described above, stores a repository creation/access module 563 which when executed causes the system to provide repository services as described above, stores a software/artifact build module 564 which when executed causes the system to perform a build (e.g., a CI build) as described above, stores a signer module 565 which when executed causes the system to sign software as described above, and stores a deploy module 566 which when executed causes the system to deploy software as described above. Note that one or more of these modules may be stored and executed on different machines (e.g., computer systems, severs, etc.).

The system may further be coupled to a display device 570, such as a light emitting diode (LED) display or a liquid crystal display (LCD) coupled to bus 515 through bus 565 for displaying information to a computer user. An alphanumeric input device 575, including alphanumeric and other keys, may also be coupled to bus 515 through bus 565 for communicating information and command selections to processor 510. An additional user input device is cursor control device 580, such as a touchpad, mouse, a trackball, stylus, or cursor direction keys coupled to bus 515 through bus 565 for communicating direction information and command selections to processor 510, and for controlling cursor movement on display device 570.

Another device, which may optionally be coupled to computer system 500, is a communication device 590 for accessing other nodes of a distributed system via a network. The communication device 590 may include any of a number of commercially available networking peripheral devices such as those used for coupling to an Ethernet, token ring, Internet, or wide area network. The communication device 590 may further be a null-modem connection, or any other mechanism that provides connectivity between the computer system 500 and the outside world. Note that any or all of the components of this system illustrated in FIG. 5 and associated hardware may be used in various embodiments as discussed herein.

It will be apparent to those of ordinary skill in the art that the system, method, and process described herein can be implemented as software stored in main memory or read only memory and executed by processor. This control logic or software may also be resident on an article of manufacture comprising a non-transitory computer readable medium having computer readable program code embodied therein and being readable by the mass storage device and for causing the processor to operate in accordance with the methods and teachings herein.

Some portions of the detailed description above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "generating", "providing", "encrypting", "decrypting", "selecting", "performing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

We claim:

1. A method for assembling software components in a provably secure manner, the method comprising:
   receiving inputs including one or more instances of software code;
   verifying trustworthiness of the one or more inputs;
   creating software code using a forward immutable continuous integration (CI) pipeline having a plurality of stages with forward immutability between consecutive pipeline stages to receive the one or more inputs verified as trustworthy and to build and test one or more containers associated with the one or more inputs, wherein each subsequent stage after a first stage of the pipeline depends on an immutable output of an immediately preceding stage in the pipeline, such that for each stage of the plurality of stages of the pipeline, all assets generated in a prior stage are immutable to actors in that stage of the pipeline, and further wherein the pipeline includes an emission stage for outputting signed, trusted software code from the pipeline; and
   storing signed, trusted software code in a repository for deployment, the repository only accepting signed software code for deployment.

2. The method defined in claim 1 wherein using the forward immutable CI pipeline comprises:
   creating one or more containers using a bakery stage from a trusted input;
   storing one or more containers in a first repository;
   running a build instance using a build CI stage by launching at least one of the one or more containers, the build instance creating built software code; and
   passing the built software code into the emission stage for signing.

3. The method defined in claim 2 wherein the first repository is an append-only repository from the bakery stage and read-only from the build CI stage.

4. The method defined in claim 1 wherein verifying trustworthiness of the one or more inputs comprises comparing a datum derived from digital data of each of the one or more inputs against expected value.

5. The method defined in claim 1 further comprising deploying the signed software code.

6. The method defined in claim 1 further comprising signing the software code using a GPG key assigned to an individual.

7. The method defined in claim 1 wherein the inputs comprise one or both of at least one machine image and at least one artifact.

8. The method defined in claim 1 wherein the one or more containers comprise at least one machine image.

9. The method defined in claim 1 wherein at least one of the plurality of stages performed a series of pipeline operations are performed and at least one intermediate result produced within the series of pipeline operations are written to a read only file system.

10. A system for managing software component builds, the system comprising: one or more hardware processors;
   a memory comprising instructions which, when executed by the one or more hardware processors, cause the system to:
   receive inputs including one or more instances of software code;
   verify trustworthiness of the one or more inputs;
   create software code using a forward immutable continuous integration (CI) pipeline having a plurality of stages with forward immutability between consecutive pipeline stages to receive the one or more inputs verified as trustworthy and to build and test one or more containers associated with the one or more inputs, wherein each subsequent stage after a first stage of the pipeline depends on an immutable output of an immediately preceding stage in the pipeline, such that for each stage of the plurality of stages of the pipeline, all assets generated in a prior stage are immutable to actors in that stage of the pipeline, and further wherein the pipeline includes an emission stage for outputting signed, trusted software code from the pipeline; and
   store signed, trusted software code in a repository for deployment, the repository only accepting signed software code for deployment.

11. The system defined in claim 10 wherein the one or more hardware processors use
   the forward immutable CI pipeline to:
   create one or more containers using a bakery stage from a trusted input;
   store one or more containers in a first repository;
   run a build instance using a build CI stage by launching at least one of the one or more containers, the build instance creating built software code; and
   pass the built software code into the emission stage for signing.

12. The system defined in claim 11 wherein the first repository is an append-only repository from the bakery stage and read-only from the build CI stage.

13. The system defined in claim 10 wherein the one or more hardware processors verifies trustworthiness of the one or more inputs by comparing a datum derived from digital data of each of the one or more inputs against expected value.

14. The system defined in claim 10 wherein the one or more processors are operable to deploy the signed software code.

15. The system defined in claim 10 wherein the one or more hardware processors sign each of the one or more containers by signing the one or more images using a GPG key assigned to an individual.

16. The system defined in claim 10 wherein the inputs comprise one or both of at least one machine image and at least one artifact.

17. The system defined in claim 10 wherein the one or more containers comprise at least one machine image.

18. The system defined in claim 10 wherein at least one of the plurality of stages performed a series of pipeline operations are performed and at least one intermediate result produced within the series of pipeline operations are written to a read only file system.

19. A non-transitory computer readable storage media having instructions stored thereupon which, when executed by a system having at least a processor and a memory therein, cause the system to perform a method for assembling software components in a provably secure manner, the method comprising:
   receiving inputs including one or more instances of software code;
   verifying trustworthiness of the one or more inputs;
   creating software code using a forward immutable continuous integration (CI) pipeline having a plurality of stages with forward immutability between consecutive pipeline stages to receive the one or more inputs verified as trustworthy and to build and test one or more containers associated with the one or more inputs, wherein each subsequent stage after a first stage of the pipeline depends on an immutable output of an immediately preceding stage in the pipeline, such that for each stage of the plurality of stages of the pipeline, all assets generated in a prior stage are immutable to actors in that stage of the pipeline, and further wherein the pipeline includes an emission stage for outputting signed, trusted software code from the pipeline; and
   storing signed, trusted artifacts in a repository for deployment, the repository only accepting signed software code for deployment.

20. The non-transitory computer readable storage media defined in claim 19 wherein using the
   forward immutable CI pipeline comprises:
   creating one or more containers using a bakery stage from a trusted input;
   storing one or more containers in a first repository;
   running a build instance using a build CI stage by launching at least one of the one or more containers, the build instance creating built software code; and
   passing the built software code into the emission stage for signing.

21. The non-transitory computer readable storage media defined in claim 19 wherein the method further comprises deploying the signed software code.

22. The non-transitory computer readable storage media defined in claim 19 wherein the method further comprises signing the software code using a GPG key assigned to an individual.

23. The non-transitory computer readable storage media defined in claim 19 wherein the inputs comprise one or both of at least one machine image and at least one artifact, and further wherein the one or more containers comprises at least one machine image.

* * * * *